US006861499B2

(12) United States Patent  (10) Patent No.: US 6,861,499 B2
Vinciguerra et al.  (45) Date of Patent: Mar. 1, 2005

(54) BRANCHED POLYPHOSPHONATES THAT EXHIBIT AN ADVANTAGEOUS COMBINATION OF PROPERTIES, AND METHODS RELATED THERETO

(75) Inventors: Michael Vinciguerra, Hampton, NH (US); Dieter Freitag, Chelmsford, MA (US); Norman Rice, Andover, MA (US); Richard Lusignea, Allston, MA (US)

(73) Assignee: Triton Systems, Inc., Chelmsford, MA (US)

( * ) Notice: Subject to any disclaimer, the term of this patent is extended or adjusted under 35 U.S.C. 154(b) by 0 days.

(21) Appl. No.: 10/374,829

(22) Filed: Feb. 24, 2003

(65) Prior Publication Data

US 2004/0167284 A1 Aug. 26, 2004

(51) Int. Cl.[7] .............................................. C08G 79/02
(52) U.S. Cl. ...................... 528/398; 528/167; 528/487; 528/561; 528/502 R; 528/503
(58) Field of Search ................................ 528/167, 487, 528/561, 502 R, 503, 398, 484

(56) References Cited

U.S. PATENT DOCUMENTS

| | | | |
|---|---|---|---|
| 2,271,610 A | 9/1942 | Coover et al. |
| 2,435,252 A | 3/1948 | Fon et al. |
| 2,534,242 A | 11/1950 | Cusic |
| 2,682,522 A | 6/1954 | Coover et al. |
| 2,891,915 A | 6/1959 | McCormack et al. |
| 3,326,852 A | 6/1967 | Thomas |
| 3,719,727 A | 3/1973 | Masai et al. |
| 3,829,405 A | 8/1974 | Cohen et al. |
| 3,830,771 A | 8/1974 | Cohen et al. |
| 3,925,303 A | 12/1975 | Rio et al. |
| 3,946,093 A | 3/1976 | Koto et al. |
| 4,046,724 A | 9/1977 | Kato et al. |
| 4,223,104 A | 9/1980 | Kim et al. |
| 4,229,552 A | 10/1980 | Shiozaki et al. |
| 4,322,520 A | 3/1982 | Schmidt et al. |
| 4,328,174 A | 5/1982 | Schmidt et al. |
| 4,331,614 A | 5/1982 | Schmidt et al. |
| 4,374,971 A | 2/1983 | Schmidt et al. |
| 4,401,802 A | 8/1983 | Schmidt et al. |
| 4,415,719 A | 11/1983 | Schmidt et al. |
| 4,481,350 A | 11/1984 | Schmidt et al. |
| 4,508,890 A | 4/1985 | Schmidt et al. |
| 4,719,279 A | 1/1988 | Kauth et al. |
| 4,762,905 A | 8/1988 | Schmidt et al. |
| 4,782,123 A | 11/1988 | Kauth et al. |
| 5,216,113 A | 6/1993 | Schulz-Schlitte et al. |
| 5,334,692 A | 8/1994 | Hess et al. |
| 6,288,210 B1 | 9/2001 | Shobha et al. |

FOREIGN PATENT DOCUMENTS

| | | |
|---|---|---|
| EP | 1026191 A | 8/2000 |
| WO | WO 99/46315 A | 9/1999 |

OTHER PUBLICATIONS

American Society for Test Methods; Test ASTMD2863; http://www.astm.org/cgi–bin/SoftCart.exe/DATABASE-.CART/REDLINE_PAGES/D2863.htm?L+mystore+ttqwl337.

*Primary Examiner*—Duc Truong
(74) *Attorney, Agent, or Firm*—Raymond A. Miller; Pepper Hamilton LLP

(57) ABSTRACT

Disclosed are branched polyphosphonates produced via a superior transesterification process, and methods related thereto. These branched polyphosphonates exhibit a unique and advantageous combination of properties, such as outstanding fire resistance, improved heat stability, improved toughness, and superior processing characteristics. Also disclosed are polymer compositions that comprise these branched polyphosphonates and at least one other polymer, wherein the resulting polymer compositions exhibit flame retardant properties. Further disclosed are articles of manufacture produced from these polymers, such as fibers, films, coated substrates, moldings, foams, fiber-reinforced articles, or any combination thereof; these articles may be coated with a moisture barrier to enhance their moisture resistance properties.

27 Claims, No Drawings

BRANCHED POLYPHOSPHONATES THAT EXHIBIT AN ADVANTAGEOUS COMBINATION OF PROPERTIES, AND METHODS RELATED THERETO

TECHNICAL FIELD

The present invention relates generally to branched polyphosphonates, and more specifically to branched polyphosphonates produced via a superior transesterification process, polymer compositions comprising these branched polyphosphonates, and flame retardant coatings and articles produced therefrom.

BACKGROUND

A synthetic approach that has shown promise in producing branched polyphosphonates has been the transesterification process. The transesterification process involves the reaction of a phosphonic acid diaryl ester, a bisphenol, a branching agent (tri or tetra phenol or phosphonic acid ester), and a basic catalyst carried out in the melt, usually in an autoclave. Transesterification is a chemical reaction that is an equilibrium between the starting materials and the products (polyphosphonate and phenol). The reaction is typically carried out at high temperature under reduced pressure. The by-product, phenol, is removed from the reaction by distillation; this helps shift the equilibrium toward polyphosphonate formation. One major problem with this process is that under the conditions of phenol removal, the phosphonic acid diaryl ester is also volatile and can co-distill with the phenol, leading to stoichiometric imbalance and shifting of the equilibrium which leads to lower molecular weight and reactive end groups. This problem has been addressed by the placement of a distillation column in the process that allows for separation of the phenol from the phosphonic acid diaryl diester and condensation of the diester back into the reaction vessel. This approach has only achieved limited success because some of the phosphonic acid diaryl ester is still lost during the process resulting in a stoichiometric imbalance and low molecular weight product that contains reactive end groups such as hydroxyl groups. Thus, the reaction conditions (temperature, time and pressure), stoichiometric balance of the starting materials, amount of branching agent, and amount and type of catalyst are critical parameters for synthesizing branched polyphosphonates that are free of cross-links and exhibit improved properties.

Several patents have addressed the use of branching agents (see e.g., U.S. Pat. Nos. 2,716,101; 3,326,852; 4,328,174; 4,331,614; 4,374,971; 4,415,719; 5,216,113; 5,334,692; and 4,374,971); generally, sodium phenolate is used as the catalyst in these processes, but other metal catalysts have also been used. These approaches have met with some degree of success, however, the combination of properties exhibited by these polyphosphonates are still not sufficient for general acceptance in the marketplace.

Quaternary phosphonium catalysts and aqueous-phenol based quaternary phosphonium catalyst mixtures have reportedly been used in the synthesis of polycarbonates (see e.g., U.S. Pat. Nos. 3,442,854 and. 6,291,630 B1). However, these catalysts have not been applied to the synthesis of polyphosphonates, nor is it obvious that they would work better than any other known catalyst for these materials.

SUMMARY OF THE INVENTION

In view of the above, there is a need for a method of producing branched polyphosphonates without any chemical cross-links that lead to poor solubility and high melt viscosity (i.e., poor processing characteristics). There is also a need for a method of synthesizing branched polyphosphonates that exhibit improved heat stability, toughness, and processing characteristics (i.e., melt stability and resistance to yellowing). In addition, there is a need for halogen-free, flame retardant additives that readily mix with commodity or engineering plastics to yield extraordinary polymer compositions that exhibit a negligible depression in Tg, heat stability or toughness, and significant improvement in the limiting oxygen index (LOI).

It is, therefore, an object of the present invention to provide a method for producing branched polyphosphonates by the transesterification route using specific molar ratios of a phosphonic acid diaryl ester, a bisphenol, a branching agent, and a specific catalyst.

It is another object of the present invention to formulate flame retardant, branched polyphosphonates that exhibit improvements in heat stability (i.e., increased Tg), toughness, and processing characteristics (i.e., high degree of melt flow and resistance to yellowing).

It is another object of the present invention to formulate polymer compositions comprising these branched polyphosphonates and commodity or engineering plastics.

It is yet another object of the present invention to produce articles of manufacture from these branched polyphosphonates or from polymer compositions comprising these branched polyphosphonates.

It is a further object of the present invention to improve the hydrolytic stability of these branched polyphosphonates or their polymer compositions with the application of a coating to the surfaces of the articles produced therefrom.

One embodiment of the present invention is a method for producing branched polyphosphonates yields a branched polyphosphonate wherein the polyphosphonate has a relative viscosity greater than 1.1 when measured on a 0.5 percent solution in methylene chloride at 23° C. Another embodiment of the present invention is a method for producing branched polyphosphonates wherein the polyphosphonate exhibits at Tg of at least 100° C. as measured by differential scanning calorimetry.

The present invention pertains to a superior method for synthesizing polyphosphonates by transesterification using a phosphonic acid diaryl ester, a bisphenol, a branching agent and a phosphonium catalyst. This method involves placing more than about a 2.0% molar excess amount of a phosphonic acid diaryl ester (relative to the molar amount of bisphenol), a bisphenol, at least about 0.001 mole of a branching agent (per one mole of bisphenol) and at least about 0.00004 mole of a phosphonium catalyst (per one mole of bisphenol) into a reaction vessel; heating the mixture in the vessel under vacuum to a temperature where phenol begins to distill from the vessel; and heating the reaction mixture until the evolution of phenol has stopped. This synthetic method yields branched polyphosphonates that exhibit improvements in heat stability, toughness and processing characteristics.

The present invention also relates to polymer compositions produced from these branched polyphosphonates. A polymer composition comprises at least one branched polyphosphonate of the present invention with at least one other polymer, which may be a commodity or engineering plastic, such as polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, cellulose polymer, or any combination thereof. The polymer composition may be produced via blending, mixing, or compounding the constituent polymers. Due to the branched polyphosphonates of the present invention, the resulting polymer compositions exhibit exceptional flame resistance (i.e., higher LOI), heat stability (minimal Tg depression), and processing characteristics (i.e., reduced melt viscosity and low color). The present invention further relates to the application of coatings, particularly moisture barrier coatings, to the surface of articles produced from the branched polyphosphonates or the polymer compositions of the present invention for improved hydrolytic stability.

The branched polyphosphonates and polymer compositions of the present invention can be used as coatings or they can be used to fabricate free-standing films, fibers, foams, molded articles, and fiber reinforced composites.

The above summary of the present invention is not intended to describe each illustrated embodiment or every implementation of the present invention. The detailed description, which follows, particularly exemplifies these embodiments.

DETAILED DESCRIPTION OF EXEMPLARY EMBODIMENTS

The present invention pertains to a method for preparing flame retardant, branched polyphosphonates having an advantageous combination of properties (glass transition temperature "Tg", toughness and processability) at a low molecular weight via a transesterification process by reacting a phosphonic acid diaryl ester, a bisphenol, and a branching agent in the presence of a phosphonium catalyst. The terms "flame retardant", "flame resistant", "fire resistant" or "fire resistance", as used herein, mean that the polymer exhibits a limiting oxygen index of at least 27. The term "low molecular weight", as used herein, means that the polymer exhibits a relative viscosity of about 1.2 or less when measured on a 0.5% weight/volume solution in methylene chloride solution at 23° C. The term "good toughness", as used in Examples 1 and 2, means that a specimen molded from the branched polyphosphonate of the present invention exhibits a fracture energy that is greater than that of a specimen prepared from a state-of-the-art branched polyphosphonate, such as Example 3.

The reaction is conducted at a high temperature in the melt under vacuum. The reaction temperature and pressure are adjusted at several stages during the course of the reaction. The stoichiometric imbalance (i.e., molar ratio) of the phosphonic acid diaryl ester to the bisphenol, the concentration the branching agent, and the type and concentration of the catalyst are important aspects of this invention. A stoichiometric imbalance ratio of at least about 2.0 mole % excess of the phosphonic acid diaryl ester is preferred. Precise control of the amount of phosphonium catalyst is important to obtain branched polyphosphonates that are essentially free of hydroxy or phenolate end groups and free of chemical cross-links. The molar amount of phosphonium catalyst used (relative to the molar amount of bisphenol) is from about 0.00004 moles to about 0.0012 moles per one mole of bisphenol, with the range of about 0.0001 moles to about 0.0005 moles per one mole of bisphenol being preferred, and about 0.0002 moles per one mole of bisphenol being most preferred. The molar amount of branching agent used (relative to one mole of bisphenol) is from about 0.0005 moles to about 0.020 moles, with the range of about 0.001 moles to about 0.015 moles per one mole of bisphenol being preferred. The combination of these parameters, i.e., the excess concentration of the phosphonic acid diaryl ester, the amount and type of phosphonium catalyst, and the amount of branching agent, is an important aspect of this invention.

The methods of the present invention allow for the use of phosphonic acid diaryl esters having purities less than 98%. The ability to use lower purity monomer is a major advantage because it mitigates the need for additional purification steps, which contributes to cost reduction. By following the method of the present invention, branched polyphosphonates, essentially free of hydroxyl or phenolate end groups, free of chemical cross-links, and with outstanding flame resistance, improved heat stability, improved toughness, and lower color are obtained. The term "improved heat stability", as used herein, refers to an increase in the glass transition temperature of the branched polyphosphonates of the present invention as compared to state-of-the-art branched polyphosphonates. For example, the state-of-the-art branched polyphosphonate described in U.S. Pat. No. 4,331,164, (column 10) and in *Die Angewandte Makromolekulare Chemie* (Vol. 132, 8 (1985)) has a Tg of 90° C., whereas the branched polyphosphonates of the present invention exhibit Tg's near 105° C. This significant increase implies a better retention of properties at elevated temperatures and a higher potential use temperature.

The methods of synthesizing branched polyphosphonates disclosed herein can be used with nearly any combination of a phosphonic acid diaryl ester, a bisphenol, a branching agent, and a suitable phosphonium catalyst. A phosphonic acid diaryl ester preferred for use herein is methyldiphenoxyphosphine oxide (chemical structure shown below).

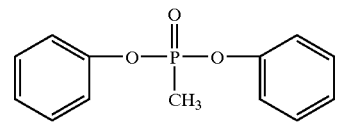

This synthetic method can be used with any bisphenol. Preferred bisphenols for use herein include 4,4'-dihydroxybiphenyl, 4,4'-dihydroxyphenyl sulfone, 2,2-bis (4-hydroxyphenyl) propane (bisphenol A) (these bisphenols are commercially available from, for example, Sigma-Aldrich Co., Milwaukee, Wis.; Biddle Sawyer Corp., New York, N.Y.; and Reichold Chemicals, Inc., Research Triangle Park, N.C., respectively), 4,4'-dihydroxyphenyl ether, 9,9-dihydroxy-phenylfluorene and 1,1-bis(4-hydroxyphenyl)-3,3-dimethyl-5-methyl cyclohexane (TMC) (chemical structure shown below). Copolymers prepared using two or more of any combination of bisphenols can also be prepared via this synthetic method.

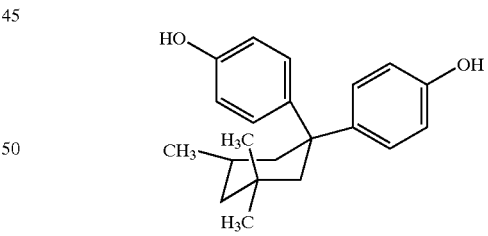

TMC bisphenol

The methods of the present invention for synthesizing branched polyphosphonates are compatible with a variety of branching agents. A preferred branching agent is 1,1,1-tris (4-hydroxyphenyl)ethane (a product of DuPont, Wilmington, Del., commercially available from Electronic Polymers, Dallas, Tex.).

Tetraphenylphosphonium catalyst derivatives associated with an anion are preferable for use herein. Examples of preferred anions include tetraaryl borohydride, a halide, and a substituted or unsubstituted phenolate group (commercially available from, for example, Fisher Scientific, Pittsburg, Pa.; Fisher Scientific; and Sigma-Aldrich, respectively). Most preferred catalyst for use herein is tetraphenylphosphonium phenolate.

The branched polyphosphonates of the present invention can also be used to produce polymer compositions having advantageous characteristics. The term "polymer composition", as used herein, refers to a composition that comprises at least one branched polyphosphonate of the present invention and at least one other polymer. There term "other polymer", as used herein, refers to any polymer other than the branched phosphonates of the present invention. These other polymers may be commodity or engineering plastics. Examples of these other polymers include polycarbonate, polyacrylate, polyacrylonitrile, polyester, polyamide, polystyrene (including high impact strength polystyrene), polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalline polymer, cellulose polymer, or any combination thereof (commercially available from, for example, GE Plastics, Pittsfield, Me.; Rohm & Haas Co., Philadelphia, Pa.; Bayer Corp.—Polymers, Akron, Ohio; Reichold; DuPont; Huntsman LLC, West Deptford, N.J.; BASF Corp., Mount Olive, N.J.; Dow Chemical Co., Midland, Mich.; GE Plastics; DuPont; Bayer; Dupont; ExxonMobil Chemical Corp., Houston, Tex.; ExxonMobil.; Mobay Chemical Corp., Kansas City, Kans.; Goodyear Chemical, Akron, Ohio; BASF Corp.; 3M Corp., St. Paul, Minn.; Solutia, Inc., St. Louis, Mo.; DuPont; and Eastman Chemical Co., Kingsport, Tenn., respectively). The polymer compositions may be produced via blending, mixing, or compounding the constituent polymers. The branched polyphosphonates of the present invention impart flame retardant properties and better processability to the resulting polymer compositions, with a negligible effect on their heat stability, toughness, and color.

In another embodiment of the present invention, the surfaces of articles fabricated from the branched polyphosphonates or the polymer compositions are coated to improve their hydrolytic stability. Coatings preferred for use herein are those that adhere well to the branched polyphosphonate and provide an effective barrier to moisture and/or high humidity. Examples of such preferred coating materials include polysilicones; polysiloxanes; polyoxysilsesquioxanes; fluoropolymers; liquid crystalline polymers; polymers containing metal, ceramic, metal oxide, or carbon particles, or any combination thereof; and sol-gel silicate-type; or any combination thereof (commercially available from, for example, Witco Chemical Corp., Greenwich, Conn.; Rhodia Silicones, Cranbury, N.J.; Gelest Inc., Morrisville, Pa.; Celanese AG, Dallas, Tex.; DuPont; and SDC Coatings, Inc., Anaheim, Calif., respectively). An example of a more preferred coating material is a polysiloxane that contains nanosilica and/or nanoalumina. The coatings can be applied by dip-coating, spraying, vacuum deposition, or other commonly used coating methods. A drying step may follow the application of the coating.

It is contemplated that branched polyphosphonates or the polymer compositions of the present invention may comprise other components, such as fillers, surfactants, organic binders, polymeric binders, crosslinking agents, coupling agents, anti-dripping agents, colorants, inks, dyes, or any combination thereof.

The branched polyphosphonates and the polymer compositions of the present invention can be used as coatings or they can be used to fabricate articles, such as free-standing films, fibers, foams, molded articles and fiber reinforced composites. These articles may be well-suited for applications requiring fire resistance.

The branched polyphosphonates produced via the synthetic method of the present invention are self-extinguishing in that they immediately stop burning when removed from a flame. Any drops produced by melting these branched polyphosphonates in a flame instantly stop burning and do not propagate fire to any surrounding materials. Moreover, these branched polyphosphonates do not evolve any noticeable smoke when a flame is applied. Accordingly, these branched polyphosphonates can be used as additives in commodity or engineering plastics to significantly improve fire resistance without severely degrading their other properties, such as toughness or processing characteristics.

The novel, branched polyphosphonates of the present invention exhibit outstanding flame resistance and a more advantageous combination of high Tg, toughness and lower color, as compared to the state-of-the-art branched polyphosphonates. Such improvements make these materials useful in applications requiring outstanding fire retardancy, high temperature performance, high impact resistance, and low color. The method for synthesizing these branched polyphosphonates requires less pure starting materials than the state-of-the-art methods, which thereby reduces production costs.

The relationship and usefulness of solution viscosity as a measure of polymer molecular weight has been recognized since the 1930's. Solution viscosity is a measure of the size or extension in space of polymer molecules; it is empirically related to molecular weight. The simplicity of the measurement and the usefulness of the solution viscosity-molecular weight correlation are so great that viscosity measurement constitutes an extremely valuable tool for the molecular characterization of polymers. It is further recognized that lower molecular weight is indicative of lower melt viscosity, and low melt viscosity facilitates easy and cost-effective processing of polymers.

The impact strength of plastics is related to toughness and is commonly measured by tests in which a pendulum with a massive striking edge is allowed to hit the specimen. The energy required to break the specimen is determined. The specimen is often notched to improve the reproducibility of the failure mode.

The limiting oxygen index (LOI) of a material is indicative of its ability to burn once ignited. The test for LOI is performed according to a procedure set forth by the American Society for Test Methods (ASTM). The test, ASTM D2863, provides quantitative information about a material's ability to burn or "ease of burn". If a polymeric material has an LOI of at least 27, it will, generally, burn only under very high applied heat.

EXAMPLES

Having generally described the invention, a more complete understanding thereof may be obtained by reference to the following examples that are provided for purposes of illustration only and do not limit the invention.

Example 1

Synthesis of a Branched Polyphosphonate

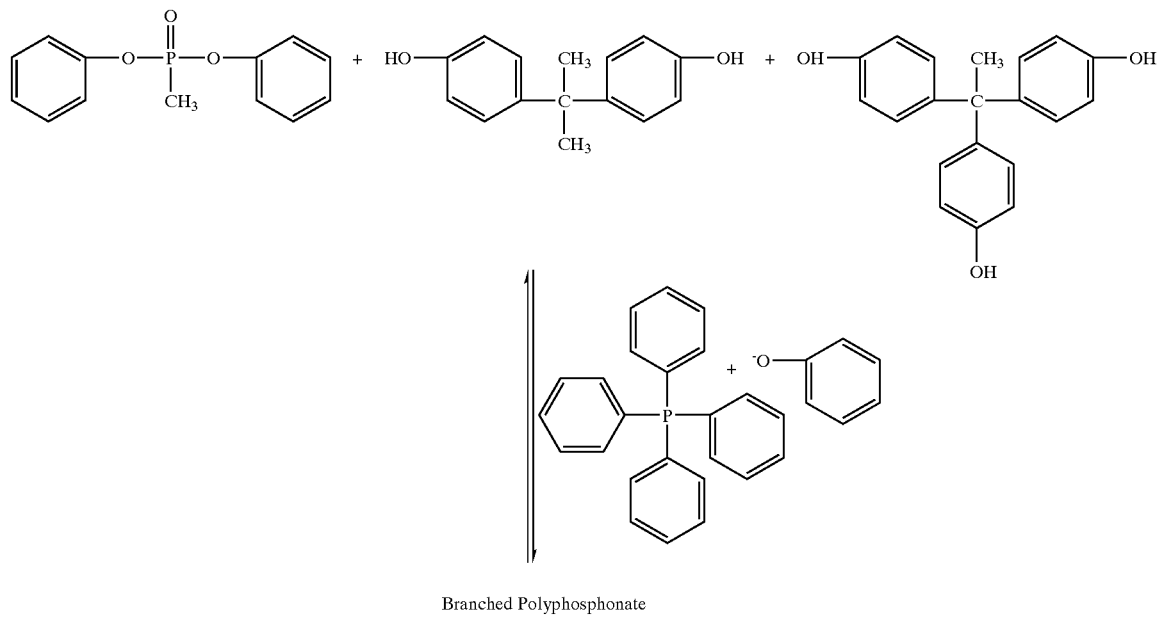

Branched Polyphosphonate

A 250 mL, three neck round bottom flask equipped with a mechanical stirrer, distillation column (10 cm) filled with hollow glass cylinders, condenser, and vacuum adapter with control valve was flushed with nitrogen for 0.5 hour. Methyldiphenoxy-phosphine oxide (38.66 g)—because this compound is 95.9% pure as determined by high performance liquid chromatography (HPLC)—the precise amount of this compound is actually (37.07 g, 0.1493 moles), 2,2-bis(4-hydroxyphenyl)propane (bisphenol A), (33.28 g, 0.1458 moles), tetraphenylphosphonium phenolate (0.012 g, $2.77 \times 10^{-5}$ moles, 0.00019 mole per one mole of bisphenol) and 1,1,1-tris(4-hydroxyphenyl)ethane (0.459 g, 0.0015 mole, 0.0103 mole per mole of bisphenol) were placed into the flask and the flask was flushed with nitrogen again. (This is an excess of 2.4 mole percent of methyldiphenoxyphosphine oxide relative to the molar amount of bisphenol). The distillation column was wrapped with heating tape and heated. The reaction vessel was placed in an oil bath and heated to 246° C. until the solids in the flask melted. The reaction mixture was further heated and the vacuum was adjusted at various times during the reaction as indicated in Table I below.

TABLE I

REACTION PARAMETERS FOR EXAMPLE 1

| Time after starting (minutes) | Oil Bath Temp. (° C.) | Vapor Temp. (° C.) | Vacuum (mm Hg) |
|---|---|---|---|
| 0 | 246 | 29 | 760 |
| 15 | 251 | 32 | 420 |
| 30 | 253 | 33 | 183 |
| 90 | 240 | 28 | 183 |
| 105 | 252 | 28 | 177 |
| 110 | 254 | 110 | 99 (Phenol began to distill) |
| 120 | 258 | 96 | 89 |
| 180 | 265 | 80 | 85 |

TABLE I-continued

REACTION PARAMETERS FOR EXAMPLE 1

| Time after starting (minutes) | Oil Bath Temp. (° C.) | Vapor Temp. (° C.) | Vacuum (mm Hg) |
|---|---|---|---|
| 210 | 266 | 84 | 23 |
| 240 | 287 | 75 | 5 |
| 255 | 291 | 110 | 0 |
| 315 | 306 | 65 | 0 (Began heating column) |
| 360 | 316 | 147 | 0 |
| 390 | 308 | 150 | 0 |
| 420 | 309 | 152 | 0 |
| 450 | 314 | 148 | 0 |
| 510 | 313 | 149 | 0 |
| 600 | 314 | 145 | 0 |
| 660 | Stopped | Stopped | Stopped |

During the course of this reaction 31.4 g of distillate was collected. At the end of the there was an increase in the viscosity of the polymer melt. Upon cooling, the pale yellow melt began to solidify. As it solidified, the solid was tough and peeled f of the inner walls of the flask. After further cooling to room temperature, the flask ken to isolate the solid. The solid polymer could not be cracked or broken with a It was so tough that it had to be removed from the stirring shaft with a saw. A 0.5% solution of the polymer in methylene chloride exhibited a relative viscosity of 1.18 at 25° C. The solid exhibited a Tg of about 104.5° C. by differential scanning calorimetry (DSC; TA Instruments Inc., Model 2010). There was no evidence of any insoluble material indicating that no cross-linked polymer was formed. A film was cast, in accordance to common casting methods, from a methylene chloride/polymer solution onto plate glass and subsequently thermally treated to remove the solvent. The film was transparent and colorless. It should be noted that the reaction temperature was held at slightly above 300° C. for more than about 3.5 hours. During this time, no decrease in the melt viscosity was observed, and there was no subsequent indication that a cross-linked polymer was formed. An infrared spectrum of the film was obtained, which showed that there were essentially no absorbances indicative of any hydroxyl or phenolic end groups at about 3250 cm$^{-1}$.

A plaque was fabricated from this polymer by compression molding. This plaque was subjected to a burn test by placing the plaque directly in the flame of a propane torch. The plaque first softened and then melted due to its thermoplastic nature. Drops of molten plastic that dripped from the plaque immediately self extinguished once they were out of the direct flame. In addition, the drops did not spread or propagate the fire to any surrounding materials. The plaque also stopped burning immediately upon removal of the flame. During this test, no dark smoke evolved from the plaque while it was in the flame or after the flame was removed. This test demonstrates the outstanding flame retardant characteristics of this polyphosphonate and, most importantly, its ability to self extinguish. These properties are critical for applications requiring fire resistance.

Example 2

Synthesis of a Branched Polyphosphonate reaction vessel was placed in an oil bath and heated to 246° C. until the solids in the flask melted. The reaction mixture was further heated and the vacuum was adjusted at various times during the reaction as indicated in Table II below.

TABLE II

REACTION PARAMETERS FOR EXAMPLE 2

| Time after starting (min) | Oil Bath Temp. (° C.) | Vapor Temp. (° C.) | Vacuum (mm Hg) |
| --- | --- | --- | --- |
| 0 | 246 | 30 | 760 |
| 15 | 259 | 30 | 267 |
| 30 | 261 | 30 | 168 |
| 60 | 242 | 30 | 168 |
| 90 | 240 | 32 | 143 |
| 96 | 240 | 32 | 315 |
| 112 | 254 | 112 | 113 (Phenol began to distill) |
| 150 | 260 | 95 | 103 |
| 192 | 256 | 85 | 137 |
| 203 | 264 | 100 | 97 |
| 240 | 258 | 95 | 46 |
| 280 | 271 | 50 | 1 (Began heating column) |

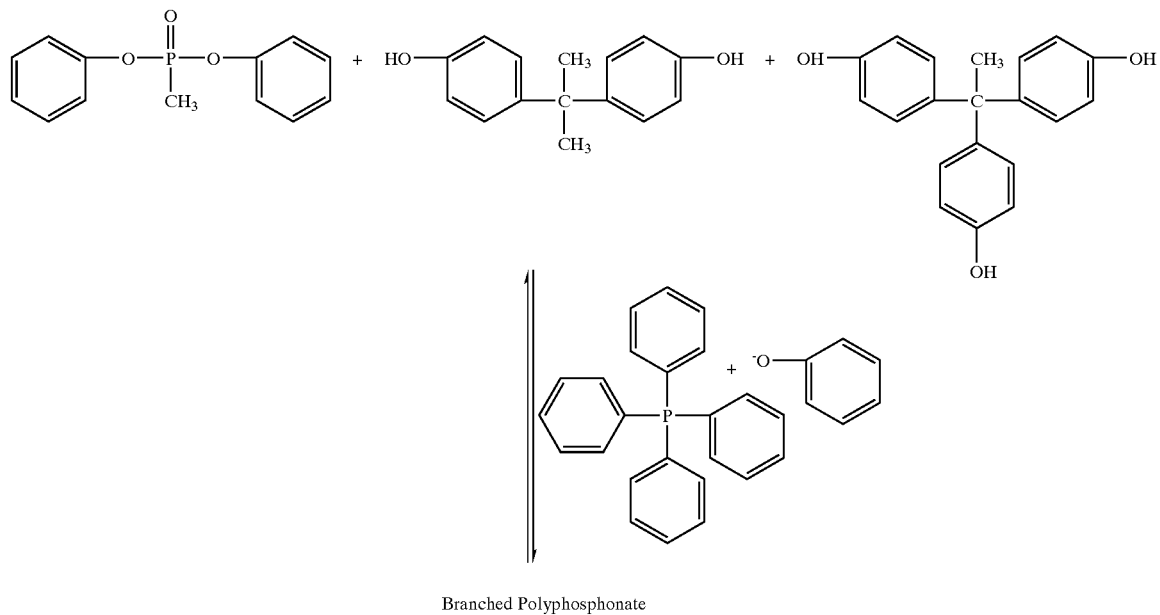

Branched Polyphosphonate

A 250 mL, three neck round bottom flask equipped with a mechanical stirrer, distillation column (10 cm) filled with hollow glass cylinders, condenser, and vacuum adapter with control valve was flushed with nitrogen for 0.5 hour. Methyldiphenoxyphosphine oxide (38.66 g)—because this compound is 95.9% pure as determined by HPLC—the precise amount of this compound is actually (37.07 g, 0.1493 moles), 2,2-bis(4-hydroxyphenyl)propane (bisphenol A), (33.28 g, 0.1457 moles), tetraphenylphosphonium phenolate (0.012 g, 2.77×10$^{-5}$ moles, 0.00019 mole per one mole of bisphenol) and 1,1,1-tris(4-hydroxyphenyl)ethane (0.459 g, 0.0015 mole, 0.0103 moles per mole of bisphenol) were placed into the flask and the flask was flushed with nitrogen again. (This is an excess of 2.4 mole percent of methyldiphenoxyphosphine oxide relative to the molar amount of bisphenol). The distillation column was wrapped with heating tape and heated. The TABLE II-continued

REACTION PARAMETERS FOR EXAMPLE 2

| Time after starting (min) | Oil Bath Temp. (° C.) | Vapor Temp. (° C.) | Vacuum (mm Hg) |
| --- | --- | --- | --- |
| 330 | 300 | 107 | 0 |
| 379 | 307 | 120 | 0 |
| 416 | 310 | 110 | 0 |
| 450 | 313 | 114 | 0 |
| 509 | 315 | 125 | 0 |
| 538 | 321 | 130 | 0 |
| 561 | 313 | 120 | 0 |
| 581 | 308 | 115 | 2 |
| 607 | 307 | 120 | 3 |

TABLE II-continued

REACTION PARAMETERS FOR EXAMPLE 2

| Time after starting (min) | Oil Bath Temp. (° C.) | Vapor Temp. (° C.) | Vacuum (mm Hg) |
|---|---|---|---|
| 625 | 306 | 120 | 3 |
| 685 | 306 | 120 | 3 |
| 690 | Stopped | Stopped | Stopped |

During the course of this reaction 34.4 g of distillate was collected. At the end of the reaction there was an increase in the viscosity of the polymer melt. Upon cooling, the viscous, light yellow melt began to solidify. As it solidified, the solid was very tough and peeled glass off of the inner walls of the flask. After further cooling to room temperature, the flask was broken to isolate the solid. The solid polymer could not be cracked or broken with a hammer. It was so tough that it had to be removed from the stirring shaft with a saw. A 0.5% solution of the polymer in methylene chloride exhibited a relative viscosity of 1.19 at 25° C. The solid exhibited a Tg of about 105.6° C. by DSC. There was no evidence of any insoluble material indicating that no cross-linked polymer was formed. A film was cast from a methylene chloride/polymer solution onto plate glass and subsequently thermally treated to remove the solvent. The film was transparent and colorless. It should be noted that the reaction temperature was held at slightly above 300° C. for more than about 3.5 hours. During this time, no decrease in the melt viscosity was observed, and there was no subsequent indication that any cross-linked polymer was formed. An infrared spectrum of the film was obtained, which showed that there were no absorbances indicative of any hydroxyl or phenolic end groups.

A plaque was compression molded from this polymer. The plaque was subjected to a burn test by placing the plaque directly in the flame of a propane torch. The plaque first softened and then melted due to its thermoplastic nature. Drops of molten plastic that dripped from the plaque immediately self extinguished once they were out of the direct flame. In addition, the drops did not spread or propagate the fire to any surrounding materials. The plaque also stopped burning immediately upon removal of the flame. During this test, no dark smoke evolved from the plaque while it was in the flame or after the flame was removed. This test demonstrates the outstanding flame retardant characteristics of this polyphosphonate and most importantly its ability to self extinguish. These properties are critical for applications requiring fire resistance.

Example 3

State-of-the-Art Comparative Example (Branched Polyphosphonate)

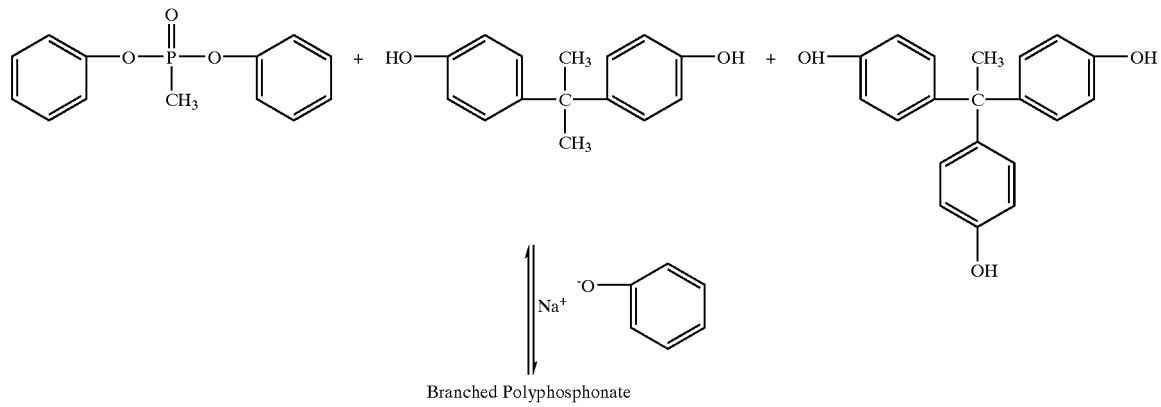

Branched Polyphosphonate

A branched polyphosphonate was prepared following information contained in U.S. Pat. Nos. 4,331,614 and 4,415,719 for comparison with the branched polyphosphonates of the present invention. The molar excess of 2,2-bis(4-hydroxyphenyl)propane (bisphenol A), (33.28 g, 0.1457 moles) to the phosphonic diester (37.07 g, 0.1493 mole) was 2.4 mole %. The amount of sodium phenolate used (0.006 g, $5.16 \times 10^{-5}$ moles) was $3.54 \times 10^{-4}$ moles relative to one mole of bisphenol, and (0.459 g, $1.5 \times 10^{-3}$ moles) of 1,1,1-tris(4-hydroxyphenyl)ethane (i.e., branching agent) was used. The reaction, conducted under conditions similar to those described for Examples 1 and 2, yielded a relatively viscous melt. The polymer was isolated and it exhibited some toughness, but not as tough as the polymers described in Examples 1 and 2. A 0.5% solution of the polymer in methylene chloride exhibited a relative viscosity of about 1.09 at 23° C. A film was cast from methylene chloride solution, it exhibited a Tg of about 90.6° C., lower toughness, yellow color, and it was noticeably more hazy than similar films prepared from the polymers prepared in accordance to the methods described in Examples 1 and 2.

Example 4

Polymer Composition: Blend of Branched Polyphosphonate and Polycarbonate

The branched polyphosphonate of Example 1 and a commercially available polycarbonate, Bayer® 2858, were melt mixed in a Brabender™ mixing machine with co-rotating 25 mm mixing elements. The samples were melt mixed at 230° C., 20 rpm for 5 minutes. The molten blend was subsequently removed from the mixing head and placed into an open mold (10 cm×10 cm) and heated to 220° C. for 15 minutes. The mold was subsequently closed and 20 bar of pressure was applied and held for 15 minutes. The mold was air-cooled and the molded plaque (10 cm×10 cm×0.3 cm) was removed. The limiting oxygen index (LOI) of the plaque was measured in accordance to ASTM D2863. The relevant data for this polymer composition is presented in Table III below.

TABLE III

POLYPHOSPHONATE/POLYCARBONATE BLEND POLYMER CHARACTERIZATION

| Polyphosphonate (%) | Polycarbonate (%) | Tg (° C.) | LOI |
|---|---|---|---|
| 0 | 100 | 146–148 | 26 |
| 10 | 90 | 145 | 28.6 |
| 20 | 80 | 143 | 35 |
| 100 | 0 | 105 | >50 |

The results indicate that the addition of 10–20%, by weight, of the branched polyphosphonate of the present invention to a commercial polycarbonate provides a significant improvement in the LOI. In addition, the polyphosphonate does not significantly depress the Tg of the resulting blend polymer composition. This is very advantageous because it does not lower the use temperature. This behavior is unexpected because a rule of mixtures effect on the Tg predicts that at a loading level of 10% and 20%, by weight, of the polyphosphonate, the resulting blend polymer composition should exhibit a Tg of 142° C. and 138° C., respectively.

As noted herein, the present invention is applicable to branched polyphosphonates, and methods and applications related thereto. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A method for producing branched polyphosphonates, comprising:

placing a molar excess of a phosphonic acid diaryl ester, one or more bisphenols including 2,2-bis(4-hydroxyphenyl)propane, a branching agent, and a phosphonium catalyst into a reaction vessel;

heating the mixture in the vessel under vacuum to a temperature where phenol beings to distill from the vessel; and heating the reaction mixture until the evolution of phenol has stopped.

2. A method for producing branched polyphosphonates according to claim 1, wherein the amount of molar excess of phosphonic acid diaryl ester is at least about 2 mole percent.

3. A method for producing branched polyphosphonates according to claim 1, wherein the amount of branching agent is at least 0.001 moles per one mole of bisphenol.

4. A method for producing branched polyphosphonates according to claim 1, wherein the amount of phosphonium catalyst is at least about 0.00004 moles per one mole of bisphenol.

5. A method for producing branched polyphosphonates according to claim 1, wherein the phosphonic acid diaryl ester is represented by the following chemical structure.

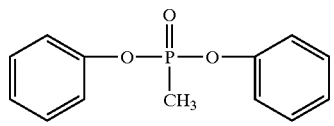

6. A method for producing branched polyphosphonates according to claim 1, wherein the other bisphenol is 4,4'-dihydroxybiphenyl, 1,1,-bis(4-hydroxyphenyl)-3,3-dimethyl-5-methyl cyclohexane, or any combination thereof.

7. A method for producing branched polyphosphonates according to claim 1, wherein the phosphonium catalyst is tetraphenylphosphonium phenolate.

8. A method for producing branched polyphosphonates according to claim 1, wherein the branching agent is 1,1,1-tris(4-hydroxyphenyl)ethane.

9. A composition comprising: the branched polyphosphonate produced in accordance to the method of claim 1.

10. A composition comprising:

a molar excess of phosphonic acid diaryl ester relative to the amount of 2,2-bis(4-hydroxyphenyl) propane, a branching agent, and a phosphonium catalyst having a substituted or unsubstituted phenolate anion combined in a reaction vessel and heated under reduced pressure to a temperature where phenol distills from a melt in the vessel; and heating the melt until the viscosity of the melt increases.

11. The composition of claim 10 the phosphonic acid diaryl ester has a purity of less than 98%.

12. The composition of claim 10, wherein the amount of molar excess of phosphonic acid diaryl ester is at least about 2 mole percent.

13. The composition of claim 10, wherein the amount of branching agent is at least 0.001 moles per one mole of bisphenol.

14. The composition of claim 10, wherein the amount of phosphonium catalyst is at least about 0.00004 moles per one mole of bisphenol.

15. The composition of claim 10 blended, mixed, or compounded with another polymer, said composition having a limiting oxygen index of at least 27.

16. The composition of claim 10 further comprising:

one or more polymers chosen from the group consisting of a polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalling polymer, polyether, polyphenylene oxide, cellulose polymer, or any combination these wherein the composition has a limiting oxygen index of at least 27.

17. The composition of claim 10 further comprising polycarbonate.

18. The composition of claim 10 further comprising a solvent, said branched polyphosphonate dissolved in said solvent.

19. A composition comprising:

a molar excess of phosphonic acid diaryl ester relative to the amount of 2,2-bis(4-hydroxyphenyl) propane and another bisphenol, a branching agent, and a phosphonium catalyst having a substituted or unsubstituted phenolate anion combined in a reaction vessel and heated under reduced pressure to a temperature where phenol distills from a melt in the vessel; and heating the melt until the viscosity of the melt increases.

20. The composition of claim 19 wherein the phosphonic acid diaryl ester has a purity of less than 98%.

21. The composition of claim 19, wherein the amount of molar excess of phosphonic acid diaryl ester is at least about 2 mole percent.

22. The composition of claim 19, wherein the amount of branching agent is at least 0.001 moles per one mole of the amount of bisphenol.

23. The composition of claim 19, wherein the amount of phosphonium catalyst is at least about 0.00004 moles per one mole of bisphenol.

24. The composition of claim 19 blended, mixed, or compounded with another polymer, said composition having a limiting oxygen index of at least 27.

25. The composition of claim 19 further comprising:
one or more polymers chosen from the group consisting of a polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly(vinyl ester), polyvinyl chloride, bismaleimide polymer, polyanhydride, liquid crystalling polymer, polyether, polyphenylene oxide, cellulose polymer, or any combination these wherein the composition has a limiting oxygen index of at least 27.

26. The composition of claim 19 further comprising polycarbonate.

27. The composition of claim 19 further comprising a solvent, said branched polyphosphonate dissolved in said solvent.

* * * * *